Figure 1:
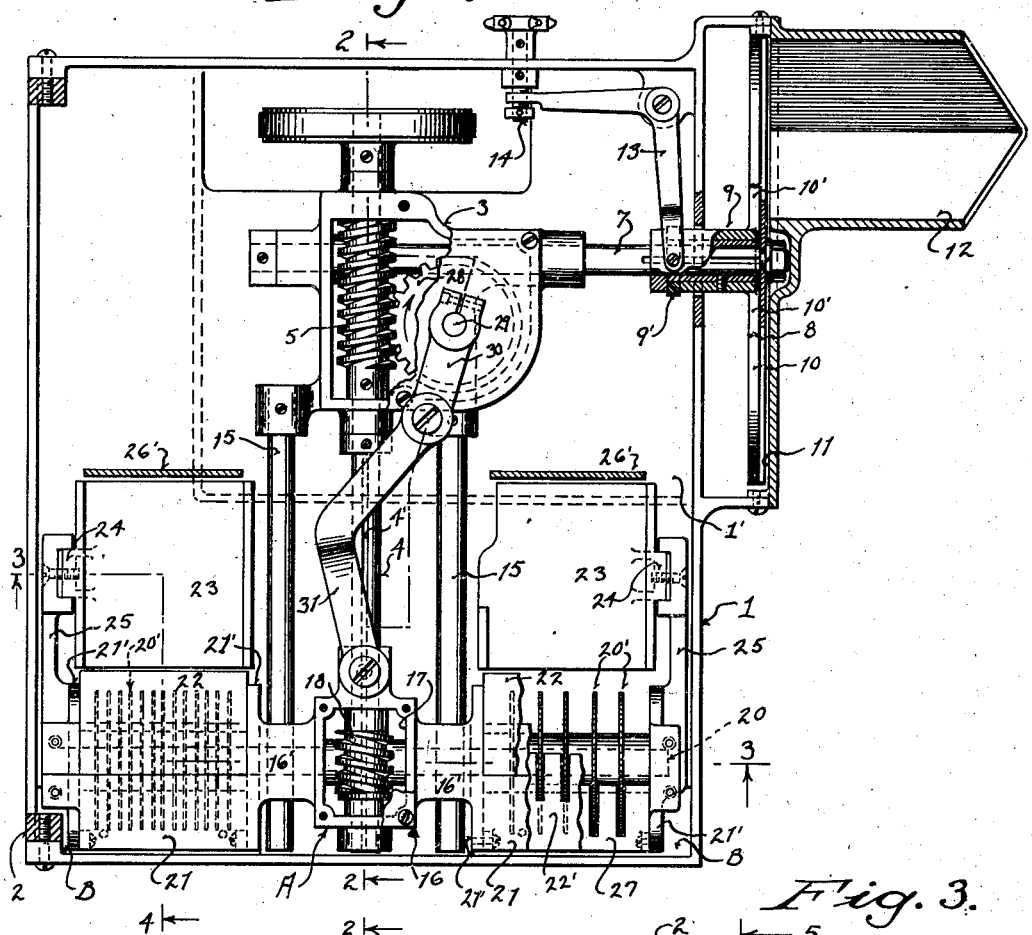

Aug. 20, 1946.  P. F. QUINN  2,406,107
MACHINE FOR CUTTING FOOD PRODUCTS
Filed April 4, 1945  3 Sheets-Sheet 1

INVENTOR
PETER F. QUINN

BY
ATTORNEYS

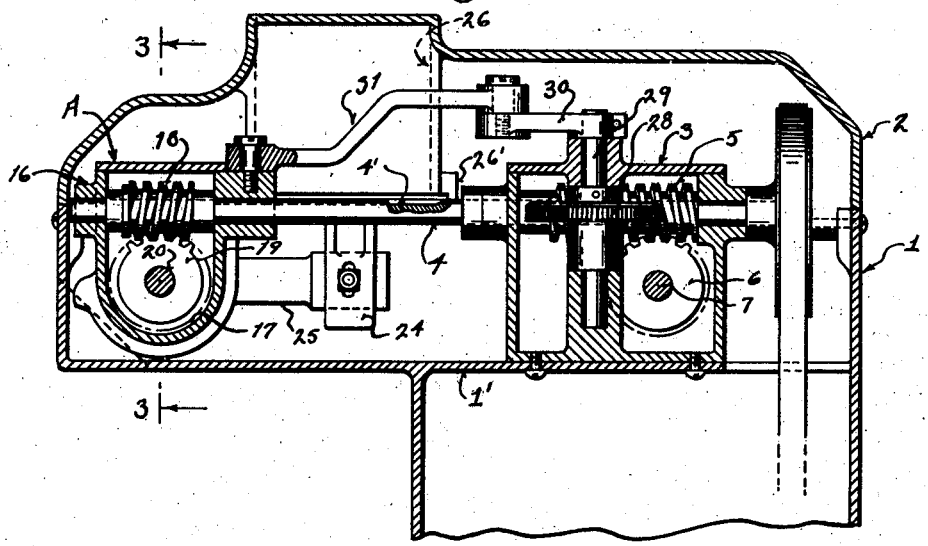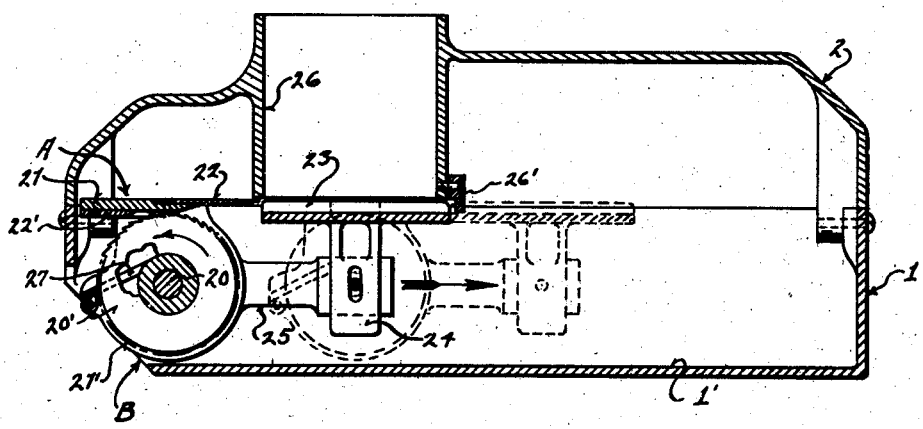

Aug. 20, 1946.    P. F. QUINN    2,406,107
MACHINE FOR CUTTING FOOD PRODUCTS
Filed April 4, 1945    3 Sheets-Sheet 3

INVENTOR
PETER F. QUINN
BY
ATTORNEYS

Patented Aug. 20, 1946

2,406,107

UNITED STATES PATENT OFFICE 2,406,107

MACHINE FOR CUTTING FOOD PRODUCTS

Peter F. Quinn, Racine, Wis.

Application April 4, 1945, Serial No. 586,571

2 Claims. (Cl. 146—78)

My invention refers to machines for slicing vegetable products, and it has for its object to provide a machine embodying triple slicing devices in gear connection, one of which device is adapted to cut whole slices from a product, while the other two devices are adapted to slice and split the slices into lengths whereby, for example, shoestring potatoes and French fried potatoes are produced simultaneously with the slicing operation to economize in the time of preparing food products.

With the above and other minor objects in view, the invention consists in certain peculiarities of construction and combination of parts, as will be fully set forth hereinafter with reference to the accompanying drawings and subsequently claimed.

Figure 3:
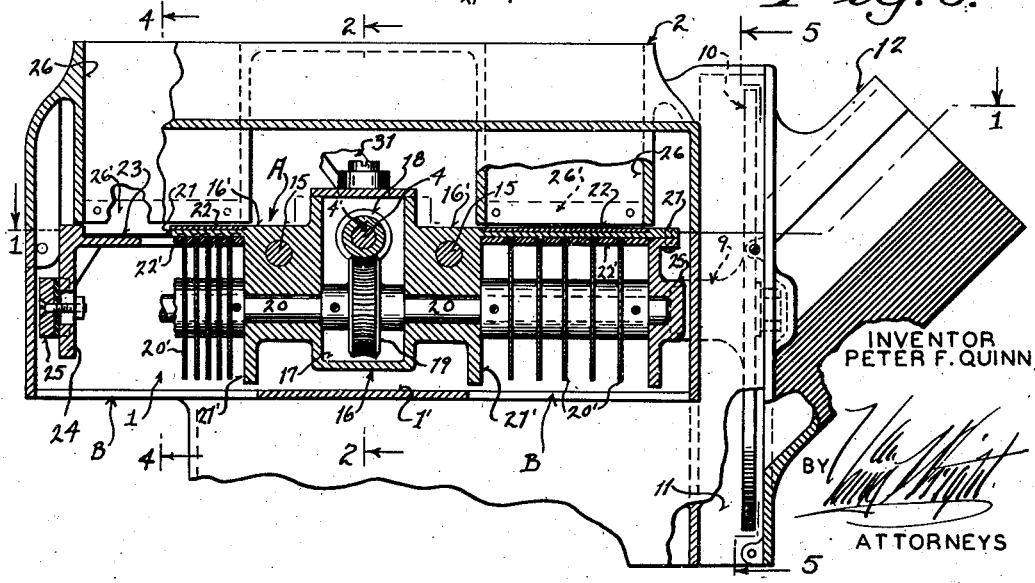
Figure 5:
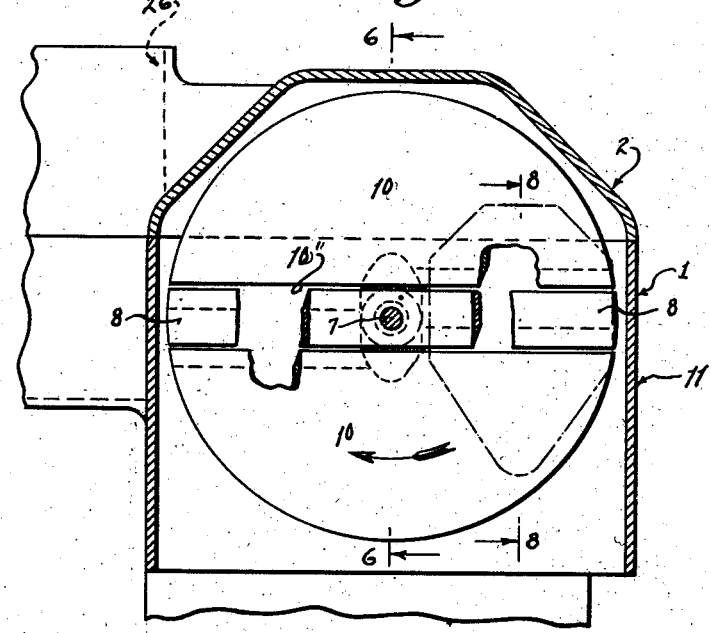
Figure 6:
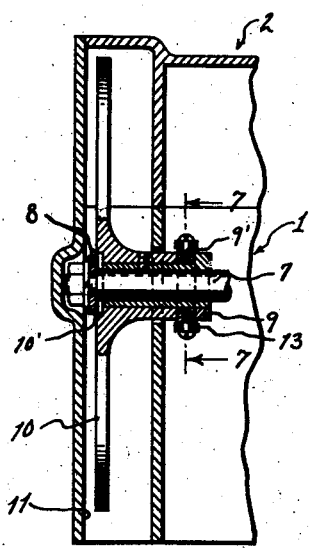
Figure 7:
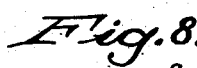
Figure 8:
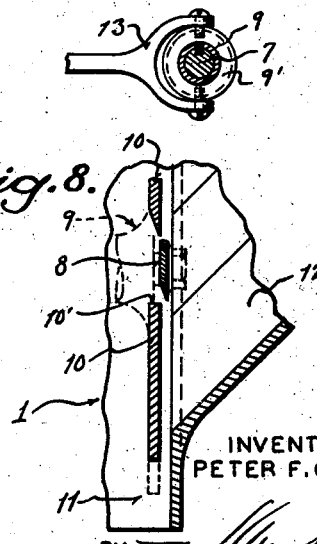

In the drawings:

Figure 1 represents a plan view of the machine with the cover removed, illustrating the drive mechanism and a double reciprocative carriage, with parts broken away and in section, as indicated by line 1—1 of Figure 3;

Figure 2, a longitudinal sectional view through the same, the section being indicated by line 2—2 of Figure 1;

Figure 3, a cross section through the machine, the section being indicated by line 3—3 of Figures 1 and 2;

Figure 4, a vertical sectional view through the machine, particularly illustrating the reciprocative carriage mechanism, the section being indicated by line 4—4 of Figure 3;

Figure 5, a detail sectional face view, illustrating the rotary cutting disc, the section being indicated by line 5—5 of Figure 3;

Figure 6, a vertical sectional view through the same, the section being indicated by line 6—6 of Figure 5;

Figure 7, a detail sectional view of a cutting disc shifting clutch mechanism, the section being indicated by line 7—7 of Figure 6, and Figure 8, a detailed vertical section illustrating a fragment of the disc feeding hopper and cutting disc.

Referring by characters to the drawings, 1 indicates a rectangular open mouthed casing, having hinged thereto a cover 2. Secured to the bottom 1' of the casing is a housing 3, into which is journaled a driven shaft 4, the same being in belt drive connection with a motor, not shown, which is carried by a hollow standard that depends from the casing.

The driven shaft 4 carries a worm 5 within the housing, and said worm is meshed with a worm wheel 6, which worm wheel is mounted upon a countershaft 7, journaled in the housing, and extending at a right angle to the main driven shaft.

The end of the countershaft is splined, and has secured thereto a cutting blade 8 extending in both directions from said shaft.

As best illustrated in Figures 1, 6 and 7, the splined end of shaft 7 has adjustably mounted thereon, a sleeved hub 9 of a disc 10, which disc is formed with a radial slot 10' from its hub for the reception of the blade 8.

The casing has projecting therefrom, an open mouthed hood 11 for the reception of the disc 10, and said hood carries an inclined feed hopper 12 for the reception of root vegetables or the like.

Fitted into a groove of the disc hub 9, is a ring 9', to which is attached the forked end of a bell crank lever 13, which lever, as shown in Figure 1 of the drawings, is pivoted to an ear of the casing.

The opposite arm of the bell crank lever is connected to a rod 14, which rod extends through the casing, and is in threaded union with the end of the bell crank lever.

When it is desired to vary the thickness of a slice, the bell crank lever is manipulated through rotation of the rod 14, whereby the disc 10 is moved back and forth with relation to the blade 8 to control the thickness of the cut slice, which slice passes through the slot 10' of the disc, and is discharged through the hood mouth.

The housing 3 has extending therefrom parallel guide-rods 15 upon opposite sides of the driven shaft 4.

The guide-rods serve as supports for a reciprocative carriage A, the base 16 of which is mounted thereon, and has arms 16' extending therefrom.

The base 16 of the carriage is formed with a pocket 17, the upper portion of which pocket is provided with apertures for the reception of the driven shaft 4, which extends therethrough, it being understood that said driven shaft is formed with a spline 4' from end to end of its exposed portion. A worm 18 is mounted upon the driven shaft 4, and has a feather engaging the spline. This worm is mounted in the carriage pocket 17.

The worm is meshed with a worm wheel 19, also mounted in the carriage pocket, and said worm wheel is secured to a cross-shaft 20, which shaft is journaled in the base 16 of the carriage and flanges thereof.

The carriage arms terminate with recessed plates 21, into which recesses are fitted knife blades 22, the plates having downwardly extending flanges 21'.

The cutting edges of these blades 22 are aligned with vegetable receiving pads 23, and the pads are supported by depending legs 24, which are adjustably secured to fingers 25, which fingers extend from the flanges of the carriage plates 21, as best shown in Figure 3 of the drawings.

The pads 23 serve as reciprocative bottom for a pair of vertically disposed hoppers 26, which are formed in the casing cover 2. It will also be noted that the inner wall of each hopper carries a gauge strip 26', which is aligned with the top surface of the pads, and serves as a stop whereby the slice of vegetable resting on said pad, is held in alignment with the hopper. It should be noted, the adjustability of the bottom pads 23, with reference to the knife edge 22, will permit varying the thickness of the slice cut from the vegetable product.

The cross-shaft 20 has mounted thereon groups of toothed splitting wheels 20' positioned directly under the carriage plates 21, and one set of the same, as shown in Figure 3, are spaced close together by rings.

This cutting apparatus is adjusted to produce what is known as shoestring potatoes. The opposite side wheels of the splitting apparatus are spaced widely apart, for the purpose of splitting coarse French fried potatoes. Obviously, other vegetable products may be treated with this combination slicer and splitter device.

As shown in Figure 4, the bottoms of the carriage plates 21 have detachably secured thereto, comb-bodies, 22' through which the cutting surfaces of the wheels 20' revolve. In order to separate the split products from the wheels and discharge the same through casing bottom openings B, B, I provide downwardly inclined slotted strip 27, which strips are detachably secured to the inner walls of the carriage flanges 21', and extend inwardly between the splitting wheels, to the hub rings thereof.

The carriage is reciprocated upon its guide rods and driven shaft 4 by a worm wheel 28, the said worm wheel being mounted upon a vertically disposed countershaft 29, journaled in the housing 3, the drive being imparted to the worm wheel from the intermeshed worm 5 of the driven shaft.

The projecting upper end of the countershaft carries a crank 30, which crank is pivotally connected by a pitman rod 31 to the base portion of the carriage. Hence, with each rotation of the crank 30, the carriage will be reciprocated forwardly and backwardly, as indicated in full and dotted lines, Figure 4.

From the foregoing description, it is apparent that when a mass body, such as a potato, is inserted into either or both of the hoppers 26, and the carriage is in the position shown in full lines, Figure 4, as it travels forwardly to the position indicated in dotted lines, the knife blade will sever a slice therefrom and said slice is held against forward travel between the gauge strip 26'. The slice, which is resting upon the pad, will be severed into a series of strips, by the splitting wheels 20', and discharged out of the casing through the opening B.

It is apparent that the splitting wheels 20' are rotated in the reciprocative action of the carriage by the feathered worm 18, which is moved back and forth upon the driven shaft due to its anchorage, within the carriage pocket 17.

While I have shown and described one exemplification of my invention minutely as to detail, it is understood that I may vary the same within the scope of the claims.

I claim:

1. A food product slicing and splitting machine, including a hopper, the slicing and splitting means comprising a spline driven shaft, guide-rods upon opposite sides of the shaft, a carriage mounted upon the guide-rods, having a pocket therein, a bottom pad for the hopper carried by the carriage and adapted to travel back and forth under said hopper, a blade extending cross-wise of the pad, spaced above and rearwardly of the edge of said pad, a cross-shaft journaled in the carriage, extending through the pocket portion thereof, a worm wheel carried by the cross-shaft within the pocket, a feathered worm slidably mounted upon the spline drive shaft in mesh with the cross-shaft worm wheel, a gang of splitting wheels carried by said cross-shaft rearwardly of, and in juxtaposition to the knife blade, a countershaft in gear connection with the drive shaft, and a crank arm carried by the countershaft in pitman connection with the carriage.

2. In a machine for cutting vegetables into different sized sliced portions having triple feed hoppers and movable knives for each hopper; the combination of a driving mechanism for the knives, comprising a power shaft, a worm fixed thereon, a counter shaft in gear connection with the power shaft worm for driving the knife of one hopper, a second worm in splined connection with said power shaft, a movable carriage having a pocket encasing the second worm wheel, guides for the carriage, a vertically disposed rotary counter shaft in driving gear connection with the fixed power shaft worm, a crank carried by the counter shaft in pitman connection with the carriage, a cross shaft journaled in the carriage in gear connection with the power shaft splined worm wheel for actuating the slicing knives of the other two hoppers, and gangs of splitting wheels carried by the cross shaft for forming the vegetable slices, from the last mentioned two hoppers, into lengths.

PETER F. QUINN.